US012595964B2

(12) United States Patent
Zuang et al.

(10) Patent No.: US 12,595,964 B2
(45) Date of Patent: Apr. 7, 2026

(54) OXYGEN LANCE GUIDING ASSEMBLY

(71) Applicant: TMT TAPPING MEASURING TECHNOLOGY SÀRL, Luxembourg (LU)

(72) Inventors: Max Zuang, Dudelange (LU); Romain Clesen, Colpach-Haut (LU)

(73) Assignee: TMT TAPPING MEASURING TECHNOLOGY SARL, Rue d'Alsace (LU)

( * ) Notice: Subject to any disclaimer, the term of this patent is extended or adjusted under 35 U.S.C. 154(b) by 394 days.

(21) Appl. No.: 18/289,163

(22) PCT Filed: May 6, 2021

(86) PCT No.: PCT/EP2021/061990
§ 371 (c)(1),
(2) Date: Nov. 1, 2023

(87) PCT Pub. No.: WO2022/233414
PCT Pub. Date: Nov. 10, 2022

(65) Prior Publication Data
US 2024/0219121 A1 Jul. 4, 2024

(51) Int. Cl.
*F27D 3/15* (2006.01)
*C21B 7/12* (2006.01)
*F27D 3/16* (2006.01)

(52) U.S. Cl.
CPC .............. *F27D 3/1527* (2013.01); *C21B 7/12* (2013.01); *F27D 2003/168* (2013.01)

(58) Field of Classification Search
CPC .... F27D 3/1527; F27D 2003/168; C21B 7/12
See application file for complete search history.

(56) References Cited

FOREIGN PATENT DOCUMENTS

| | | | |
|---|---|---|---|
| EP | 1069191 | A1 | 1/2001 |
| JP | S51159706 | U | 12/1976 |
| JP | S6255543 | U | 4/1987 |
| JP | S62156211 | A | 7/1987 |
| JP | H01263209 | A | * 10/1989 |
| JP | H02190410 | A | 7/1990 |
| JP | H02228409 | A | 9/1990 |
| KR | 20030035696 | A | 5/2003 |
| KR | 20040049101 | A | 6/2004 |

(Continued)

OTHER PUBLICATIONS

Australian Patent Office, Examination Report, Application No. 2021444332, Apr. 30, 2025, 5 pages.

(Continued)

*Primary Examiner* — Ricardo D Morales
(74) *Attorney, Agent, or Firm* — Yakov Sidorin; Quarles & Brady LLP

(57) ABSTRACT

The invention relates to an oxygen lance guiding assembly having an oxygen lance feeding device, which is disposed on a tap hole drilling unit. The tap hole drilling unit has a drilling rod guiding device for a drilling rod, which is driven by a drilling mechanism, on a receptacle configured to have the drilling mechanism disposed thereon. The oxygen lance feeding device is disposed in an operating position in a space formed between the drilling rod guiding device and the drilling mechanism in such a manner that the drilling rod guiding device serves to form an oxygen lance guiding axis.

11 Claims, 4 Drawing Sheets

(56) References Cited

FOREIGN PATENT DOCUMENTS

| | | | |
|---|---|---|---|
| KR | 101584078 | B1 | 1/2016 |
| RU | 2132390 | C1 | 6/1999 |
| RU | 2014144902 | A | 9/2017 |
| SU | 1135761 | A1 | 1/1985 |

OTHER PUBLICATIONS

Machine Translation, JP S62156211 A, Nippon Steel Corp et al., Jul. 11, 1987, 5 pages.
PCT International Search Report and Written Opinion, PCT/EP2021/061990, Jan. 28, 2022, 18 pages.
The Federal Institute of Industrial Property (FIIP), Russia, Inquiry Under the Substantive Examination and Search Report, Application No. 2023129459/05(065523), Jun. 10, 2024, 7 pages.
Japan Patent Office, Notice of Reasons for Refusal, Application No. 2023-566523, Dec. 16, 2024, 5 pages [English Language Translation Only].

* cited by examiner

OXYGEN LANCE GUIDING ASSEMBLY

CROSS-REFERENCE TO RELATED APPLICATIONS

This US Patent Application is a national phase of the pending International Patent Application No. PCT/EP2021/061990 filed on May 6, 2021 and now published as WO 2022/233414, which designates the United States. The disclosure of the above-identified International Patent Application is incorporated herein by reference.

The present invention relates to an oxygen lance guiding assembly having an oxygen lance feeding device which is disposed on a tap hole drilling unit, the tap hole drilling unit having a drilling rod guiding device for a drilling rod, which is driven by a drilling mechanism, on a receptacle for disposing the drilling mechanism thereon.

From KR 20030035696 A, an oxygen lance feeding device disposed on a tap hole drilling unit is known in which an oxygen lance, which is disposed on a roll and formed as a tube, is guided coaxially with a drilling rod inserted in the drilling mechanism by means of the oxygen lance feeding device, which is disposed in feeding direction before a drilling mechanism. To this end, the drilling rod is provided with a central guide hole, in such a manner that the oxygen lance can be inserted into the tap hole of a melting furnace through the drilling rod and emerging from a drill head of the drilling rod.

Just as the oxygen lance feeding device, the roll required for disposing the oxygen lance is located on the receptacle carrying the drilling mechanism, in such a manner that the oxygen lance, which has been unwound from the roll, is inserted into the oxygen lance feeding device by means of a guide hole of the drilling rod which is formed coaxially to the guiding axis.

The known oxygen lance guiding assembly is disadvantageous is that the known combination of the oxygen lance feeding device with the tap hole drilling unit requires using a drilling rod which is provided with a guide hole in a particular way, the drilling mechanism also having to be provided with a corresponding duct for the oxygen lance because of the oxygen lance feeding device being disposed upstream of the drilling mechanism in the feeding direction. Furthermore, the supply roll, which is disposed on the receptacle of the tap hole drilling unit in addition to the oxygen lance feeding device, causes an increase in mass which complicates the handling of the tap hole drilling unit.

Therefore, the object of the invention is to propose an oxygen lance guiding assembly having an oxygen lance feeding device disposed on a tap hole drilling unit which does not have the aforementioned disadvantages.

To attain this object, the oxygen lance feeding device of the oxygen lance guiding assembly according to the invention is disposed in an operating position in a space formed between the drilling rod guiding device and the drilling mechanism in such a manner that the drilling rod guiding device serves to form an oxygen lance guiding axis.

By disposing the oxygen lance feeding device in a space formed between the drilling rod guiding device and the drilling mechanism it is possible to provide the tap hole drilling unit both with a conventional drilling rod and a conventional drilling mechanism, neither the drilling rod nor the drilling mechanism having to be provided with a duct for guiding the oxygen lance through. Instead, the drilling rod guiding device, which is already provided, is used for guiding the oxygen lance. In an inoperative position, in which the oxygen lance feeding device is located outside of the space formed between the drilling rod guiding device and the drilling mechanism, the drilling rod, which is coupled to the drilling mechanism, can be disposed in the drilling rod guiding device in order to open the tap hole by operating the drilling rod using the drilling mechanism. After the tap hole has successfully been opened, the drilling rod can be removed from the drilling mechanism and the drilling rod guiding device, such that the oxygen lance feeding device can be transferred from the inoperative position to the operating position. In the operating position, the oxygen lance feeding device is located in the space formed between the drilling rod guiding device and the drilling mechanism, such that the oxygen lance is inserted into the oxygen lance feeding device and can be inserted into the tap hole along a guiding axis defined by the drilling rod guiding device by means of the drilling rod guiding device formed on the receptacle in order to fully open the tap hole by operating the oxygen lance. When inserting the oxygen lance into the tap hole channel of the melting furnace, the lateral deviations between the shape of the drilling rod and the shape of the oxygen lance are as small as possible, which in particular increases the operating life of the tap hole channel.

In contrast to the oxygen lance guiding assembly known from KR 102003035696 A, the oxygen lance guiding assembly according to the invention can be provided with an oxygen lance feeding device by modularly supplementing a conventional tap hole drilling unit, which is provided with a conventional drilling rod and a conventional drilling mechanism, without the oxygen lance requiring a separate oxygen lance guiding assembly in addition to the drilling rod guiding device.

It is particularly advantageous if the oxygen lance feeding device is disposed permanently on the receptacle, in particular such that the oxygen lance feeding device is transferable from an inoperative position outside of the space formed between the drilling rod guiding device and the drilling mechanism top the operating position.

It is particularly advantageous if the oxygen lance feeding device is transferable from the inoperative position above the receptacle to the operating position below the receptacle.

Regarding a particularly simple constructional design for disposing the oxygen lance feeding device on the receptacle of the tap hole drilling unit, it is particularly advantageous if the oxygen lance feeding device is transferable from the inoperative position above the receptacle to the operating position below the receptacle by means of a pivoting motion. To this end, the oxygen lance feeding device is preferably disposed on a pivot arm connected to a connector via a pivot joint for being connected to the receptacle.

The space required for disposing the oxygen lance feeding device in its operating position can be created as simply as possible if, in addition to a first guide receptacle, the drilling rod guiding device has an additional guide receptacle facing the drilling mechanism, the distance of said guide receptacle to the drilling mechanism being changeable.

A particularly advantageous feeding of the oxygen lance with the lowest possible bending load on the oxygen lance, in which a collision of the oxygen lance with the drilling mechanism disposed on the same receptacle as the oxygen lance feeding device is avoided, becomes possible if the oxygen lance feeding device has a feeding bow piece in such a manner that the oxygen lance guiding axis defined by the drilling rod guiding device forms a tangent to a guiding bow formed by the feeding bow piece. When the oxygen lance is inserted into the oxygen lance feeding device, bending stress in the material of the oxygen lance can thus be prevented, which could cause the oxygen lance to deform under the high temperature load of the material of the oxygen lance during operation of the oxygen lance in the tap hole, which could cause an asymmetrical temperature load in the tap hole channel and could thus damage the tap hole channel. Instead, the feeding bow piece allows that the oxygen lance is merely bent elastically so that a straightening by exerting corresponding bending forces on the oxygen lance is not required to the extent as is necessary with an oxygen lance that is rolled up. This also allows relatively low feed forces for the feed of the oxygen lance, which allows the feed to be controlled as precisely as possible.

It is particularly advantageous if the free insertion end of the guiding bow piece forms a feeding axis which is inclined at a feeding angle to the oxygen lance guiding axis in such a manner that an oxygen lance can be inserted laterally into a space between the oxygen lance feeding device and the drilling mechanism at the feeding angle. A lateral feeding axis of this kind allows the feeding of linear oxygen lance parts, which can be connected to another linear oxygen lance part after having been inserted into the insertion end of the feeding bow piece, in order to enable a continuous feeding of the oxygen lance by the oxygen lance feeding device starting from the provision of oxygen lance parts of a defined length.

In contrast to an insertion of an oxygen lance which is stored on a roll and which is strongly curved and thus exposed to bending stress for being straightened before it is inserted into the tap hole of the melting furnace, the linear oxygen lance parts can be inserted into the tap hole channel free from internal stress.

It is particularly preferred if the feeding axis is inclined towards the guiding axis at an acute angle, i.e., a bending load on the oxygen lance parts in the feeding bow piece can be minimized if the oxygen lance parts are fed laterally from a feeding zone, which is disposed upstream of the oxygen lance feeding device in the feeding direction.

If the oxygen lance feeding device has at least one driving roller, which forms a roller pair with a counter roller for forming a roller gap, which is disposed on the oxygen lance guiding axis, a particularly compact design of an oxygen lance feeding device with an integrated drive is possible.

Preferably, the roller gap is elastically expandable in such a manner that a thickened portion formed on an oxygen lance can pass through the roller gap when driven continuously in order to be able to preclude an impairment of a continuous feeding of the oxygen lance, which is made up of oxygen lance parts and thus has differing diameters as a result of the connection points.

If the oxygen lance feeding device has two roller pairs spaced apart by a guide piece extending on the oxygen lance guiding axis, the preferably linear guide piece can dampen possible vibrations of the oxygen lance after the oxygen lance has exited the first roller pair before it enters the second roller pair.

Hereinafter, a preferred embodiment of the invention will be described in more detail with reference to the drawing.

Figure 1:
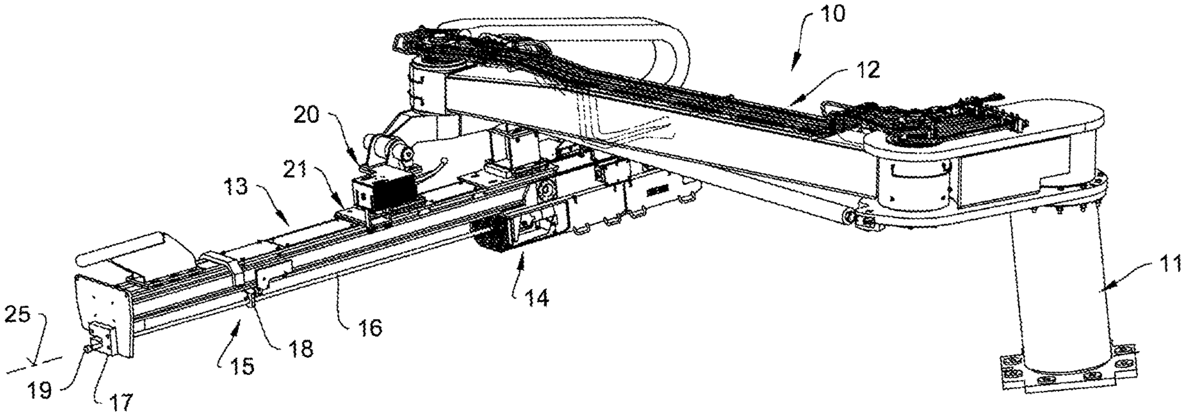
FIG. 1 shows an overall view of a tap hole drilling unit supplemented with an oxygen lance feeding device.

FIG. 1 shows an isometric overall view of a tap hole drilling unit 10 which has a receptacle 13, which is disposed on a pivot arm 12 and which is preferably formed as a drilling mast, said pivot arm 12 being disposed on a pivot base 11, said receptacle 13 being provided with a drilling mechanism 14 which can be moved lengthwise along receptacle 13 and which serves to drive a drilling rod 16 accommodated in a drilling rod guiding device 15 which is disposed on receptacle 13.

Drilling rod 16 is accommodated so as to be replaceable in a drill chuck (not shown), which is formed on drilling mechanism 14, and guided in two guide receptacles 17, 18 of drilling rod guiding device 15 in such a manner that drilling rod 16 can be removed from drilling mechanism 14 in the direction of a drilling rod guiding axis 25, in order to be able to change drilling rod 16, if necessary, in particular if a dill head 19, which is disposed on the head end of drilling rod 16, must be replaced.

As FIG. 1 further shows, an oxygen lance feeding device 20, which is disposed on drilling mast 13 like drilling mechanism 14 and which is connected to receptacle 13 via a connector 21, is located on tap hole drilling unit 10 in addition to drilling mechanism 14, drilling mast 13 forming the receptacle for disposing drilling mechanism 14. In the illustration according to FIG. 1, oxygen lance feeding device 20 is disposed in its inoperative position, such that tap hole drilling unit 10 can be used conventionally, i.e., tap hole drilling unit 10 can be used to open a tap hole of a melting furnace using drilling rod 16, which is driven by drilling mechanism 14 and accommodated in drilling rod guiding device 15, drill head 19 allowing a mechanical destruction of a sealing mass of the tap hole in order to fully open the tap hole as a prerequisite for subsequently inserting an oxygen lance.

Figure 2:
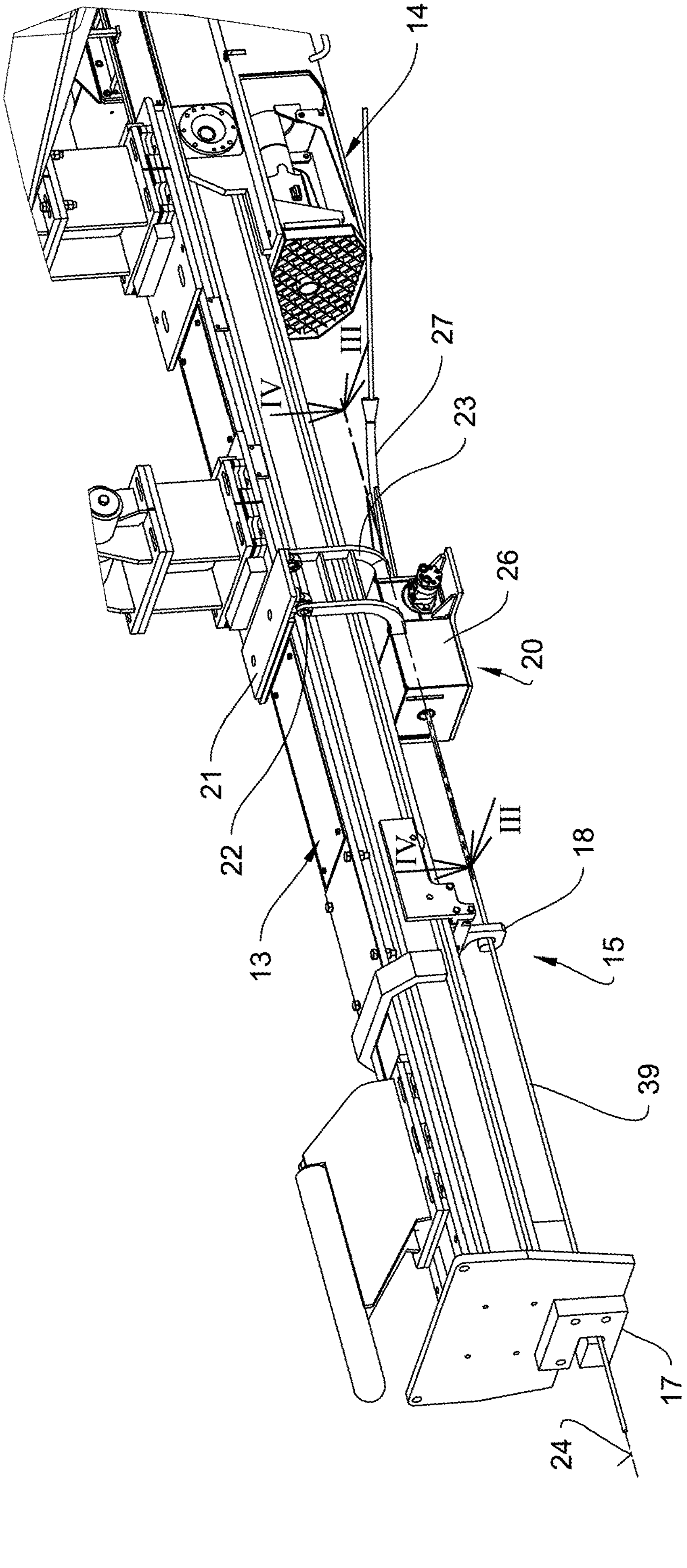
FIG. 2 shows a drilling mast disposed on a pivot arm of the tap hole drilling unit in an enlarged partial view, said drilling mast having an oxygen lance feeding device which is disposed in an operating position.

FIG. 2 shows oxygen lance feeding device 20 in its operating position, to which oxygen lance feeding device 20 can be transferred by means of a pivoting motion from the inoperative position above receptacle 13, which is formed by the drilling mast in this case, to the operating position below the receptacle. To this end, oxygen lance feeding device 20 is disposed on a pivot arm 23 connected to a connector 21 via a pivot joint 22.

As can be seen from the illustration according to FIG. 2, in its operating position, oxygen lance feeding device 20 is located in a space formed between drilling rod guiding device 15 and drilling mechanism 14 on an oxygen lance guiding axis 24, which corresponds to drilling rod guiding axis 25, which is defined by drilling rod guiding device 15, as described above. Oxygen lance feeding device 20 is configured such that a tubular oxygen lance 39 is laterally fed to oxygen lance guiding axis 24, which is defined by drilling rod guiding device 15. To this end, oxygen lance feeding device 20 has a feeding bow piece 27 disposed on a guide housing 26, as can be seen in particular in FIG. 4, which is disposed on guide housing 26 having a longitudinal guiding assembly 28 in such a manner that oxygen lance guiding axis 24 forms a tangent on a guiding bow formed by feeding bow piece 27.

In the present case, longitudinal guiding assembly 28 in guide housing 26 in combination with the guiding bow formed by guiding bow piece 27 defines a horizontal guiding plane in which an oxygen lance 39, which has been inserted into feeding bow piece 27, is inserted and continually reaches oxygen lance guiding axis 24, which corresponds to der drilling rod guiding axis 25, at a guiding angle α with respect to oxygen lance guiding axis 24, oxygen lance 39 being further guided longitudinally by guide receptacles 17, 18 of drilling rod guiding device 15, which are disposed on oxygen lance guiding axis 24 after oxygen lance 39 has exited an outlet opening 29 of guide housing 26.

Figure 3:
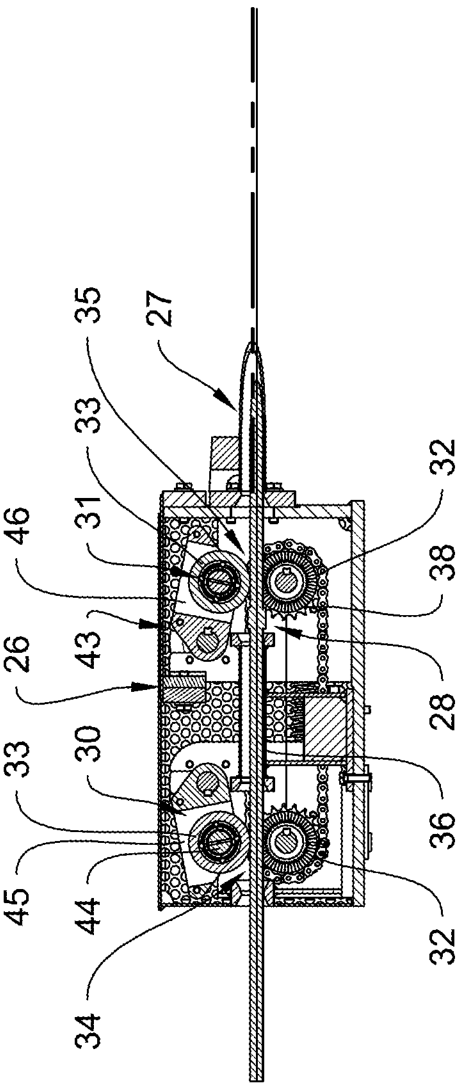
FIG. 3 shows a longitudinal sectional view of the oxygen lance feeding device shown in FIG. 2 according to cutting line III-III in FIG. 2.
Figure 4:
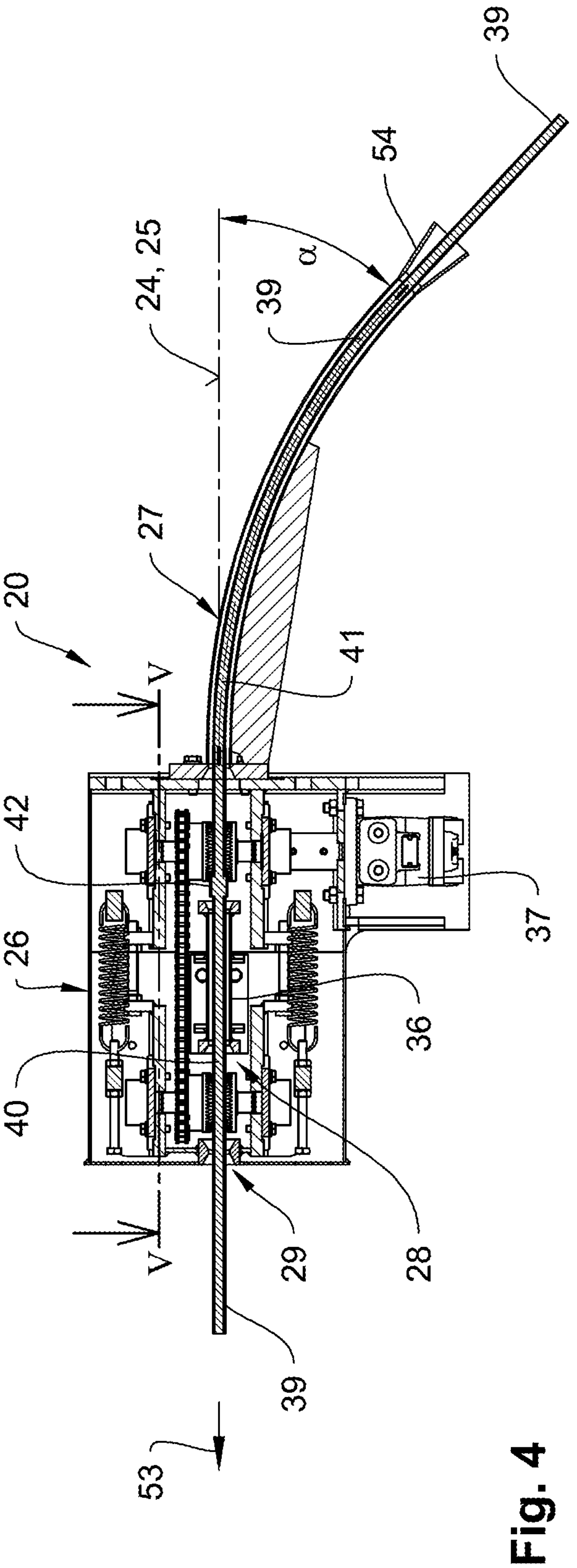
FIG. 4 shows another longitudinal sectional view of the oxygen lance feeding device shown in FIG. 2 according to cutting line IV-IV in FIG. 2.

A combined view of FIGS. 3 and 4 shows that longitudinal guiding assembly 28 in guide housing 26 is formed by two roller pairs 30, 31 in the present case, which each have a driving roller 32 and a counter roller 33, between which a roller gap 34, 35, respectively, is formed, roller gaps 34, 35 being disposed on oxygen lance guiding axis 24. A linear guide piece 36, which is formed by a tube piece in the present case, is located between roller gaps 34, 35.

To drive driving rollers 32, one driving roller 32 is driven via a drive motor 37 which is laterally flange-mounted on guide housing 26 and which is preferably a hydraulic motor, this drive being simultaneously transmitted to second driving roller 32 via a drive chain 38 connecting driving rollers 32 to each other, such that oxygen lance 39, which is guided through roller gaps 34, 35, is propelled via both roller pairs 30, 31.

Figure 5:
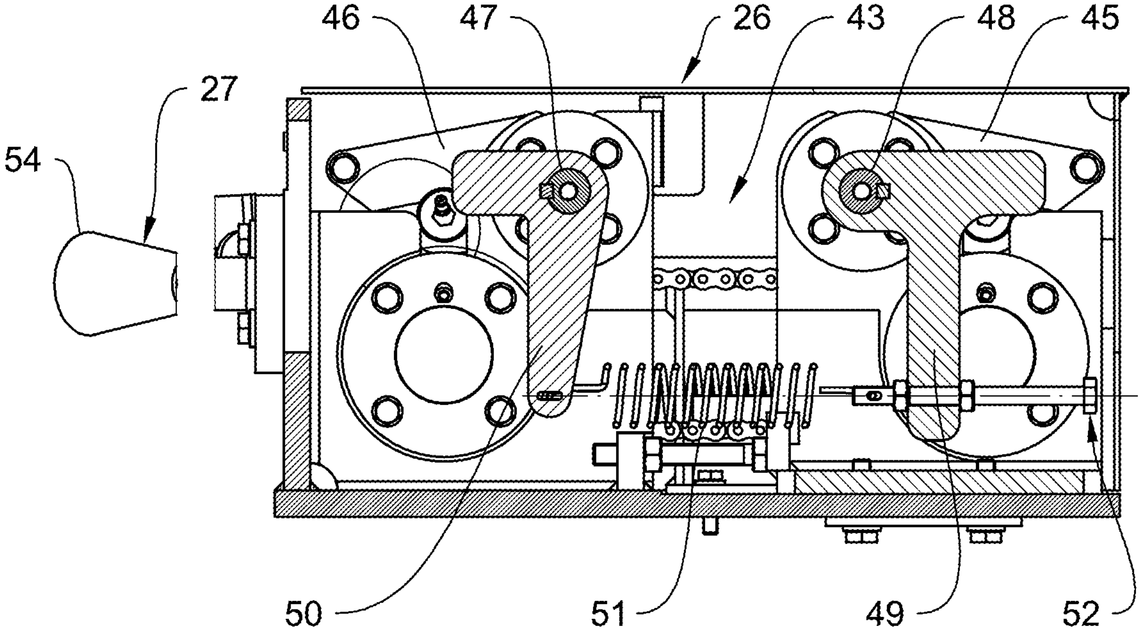
FIG. 5 shows another longitudinal sectional view of the oxygen lance feeding device shown in FIG. 4 according to cutting line V-V.

As can be seen in particular from the illustration according to FIG. 4, oxygen lance 39 is made up of several oxygen lance parts 40, 41 which are connected to each other via connecting means 42, which can be formed by clamping sleeves, for example. These connecting means 42 form thickened portions on oxygen lance 39 such that an adjustment of roller gaps 34, 35 to accommodate the differing diameters caused by connecting pieces 42 in the transition between oxygen lance parts 40, 41 is necessary for maintaining an essentially continuous traction of oxygen lance 39 through roller gaps 34, 35. To this end, as can be seen in particular in a combined view of FIGS. 3 and 5, counter rollers 33 are connected to each other via an elastically flexible pretension unit 43 in such a manner that roller axes 44 of counter rollers 33 are mounted in extensions 45, 46 of pretension unit 43, cantilevers 45, 46 being disposed on cantilever shafts 47, 48 having pivot arms 49, which are connected to each other via a spring device 51, which is designed as a tension spring in this case. For adjusting the suitable spring force, an adjustment means is disposed on one of pivot arms 49, 50.

As can be seen in particular in a combined view of FIGS. 2 and 4, oxygen lance 39 can be fed continuously to a tap hole (not shown) in feeding direction 53 by connecting additional oxygen lance part 41 to oxygen lance part 40, which protrudes from an insertion end 54 of feeding bow piece 27, via a connecting piece 42. In the course of oxygen lance 39 being propelled within oxygen lance feeding device 20, feeding bow piece 27 causes a continuous, steady alignment of oxygen lance 39 or rather of oxygen lance parts 40, 41 forming oxygen lance 39 to oxygen lance guiding axis 24 which corresponds to drilling rod guiding axis 25.

Thus, it is possible to continuously supplement oxygen lance 39, which is consumed during operation, from a charging position of an operator, said charging position being disposed laterally to drilling mast 13, or an automated charging device by means of oxygen lance feeding device 20 without a charging device even having to be disposed on receptacle 13 or tap hole drilling unit 10 in addition to oxygen lance feeding device 20.

The invention claimed is:

1. An oxygen lance guiding assembly comprising:

an oxygen lance feeding device, disposed on a tap hole drilling unit that has a drilling rod guiding device for a drilling rod, which is driven by a drilling mechanism, on a receptacle configured to receive the drilling mechanism thereon, wherein:

the oxygen lance feeding device is disposed in an operating position in a space formed between the drilling rod guiding device and the drilling mechanism in such a manner that the drilling rod guiding device serves to form an oxygen lance guiding axis.

2. The oxygen lance guiding assembly according to claim 1, wherein the oxygen lance feeding device is transferable from an inoperative position outside of the space formed between the drilling rod guiding device and the drilling mechanism to the operating position.

3. The oxygen lance guiding assembly according to claim 1, wherein the oxygen lance feeding device is transferable from an inoperative position above the receptacle to the operating position below the receptacle.

4. The oxygen lance guiding assembly according to claim 3, wherein the oxygen lance feeding device is transferable to the operating position by means of a pivoting motion.

5. The oxygen lance guiding assembly according to claim 4, wherein the oxygen lance feeding device is disposed on a pivot arm connected to a connector via a pivot joint, the connector connecting the oxygen lance feeding device to the receptacle.

6. The oxygen lance guiding assembly according to claim 1, wherein the drilling rod guiding device comprises a first guide receptacle and an additional guide receptacle facing the drilling mechanism, and wherein a distance between said additional guide receptacle and the drilling mechanism is changeable.

7. The oxygen lance guiding assembly according to claim 1, wherein the oxygen lance feeding device has a feeding bow piece positioned in such a manner that the oxygen lance guiding axis is tangential to a guiding bow formed by the feeding bow piece.

8. The oxygen lance guiding assembly according to claim 7, wherein a free insertion end of the feeding bow piece forms a feeding axis, wherein the feeding axis is inclined towards the oxygen lance guiding axis at a feeding angle α in such a manner that an oxygen lance is insertable laterally at the feeding angle α into a space formed between the oxygen lance feeding device and the drilling mechanism.

9. The oxygen lance guiding assembly according to claim 1, wherein the oxygen lance feeding device has at least one driving roller that forms a roller pair with a counter roller, the at least one driving roller and the counter roller forming a roller gap that is defined therebetween on the oxygen lance guiding axis.

10. The oxygen lance guiding assembly according to claim 9, wherein the roller gap is elastically expandable in such a manner that a thickened portion on an oxygen lance passes through the roller gap when operated continuously.

11. The oxygen lance guiding assembly according to claim 10, wherein the oxygen lance feeding device has two roller pairs spaced apart by a guide piece that extends on the oxygen lance guiding axis.

* * * * *